UNITED STATES PATENT OFFICE.

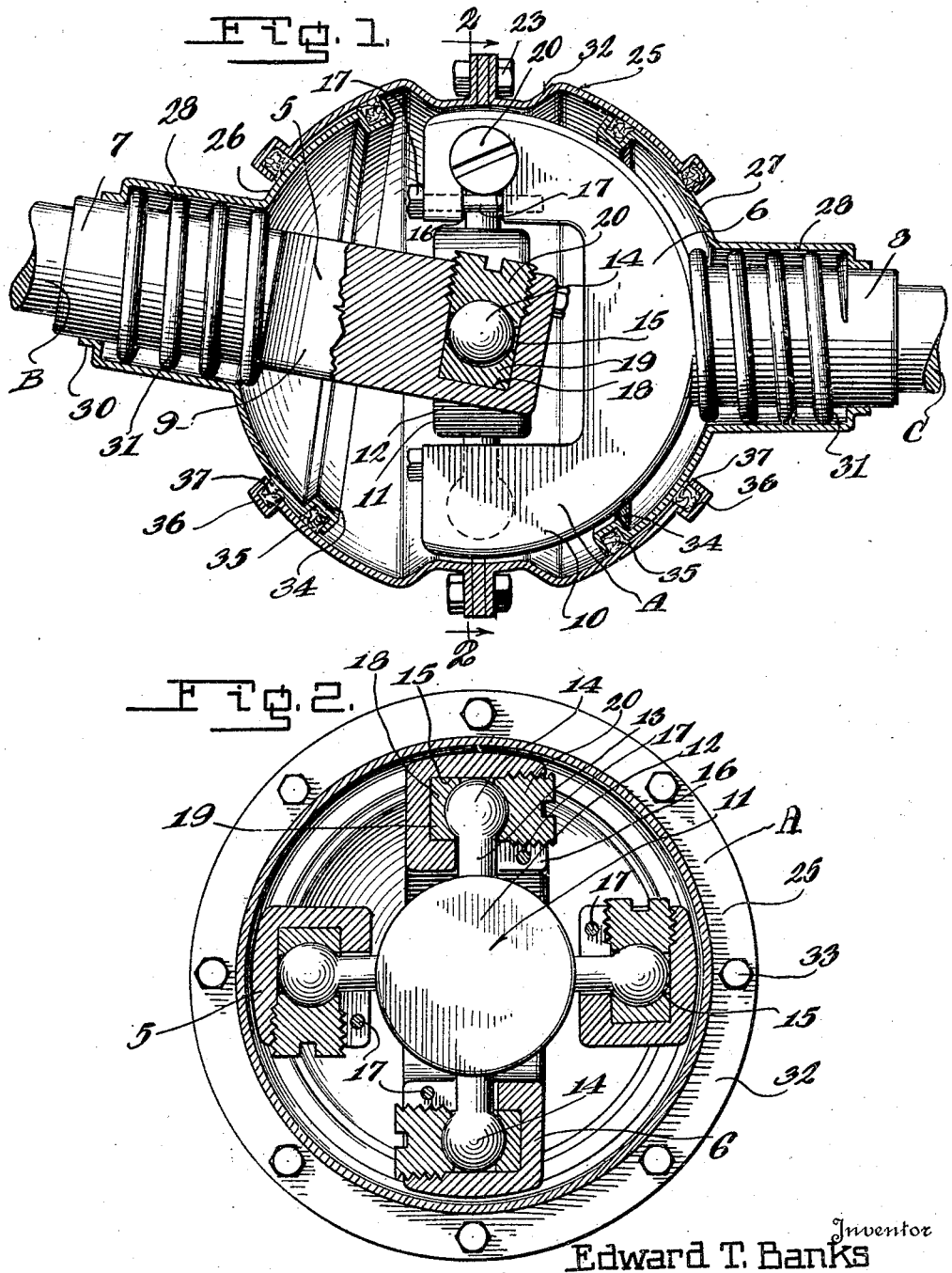

EDWARD T. BANKS, OF LOS ANGELES, CALIFORNIA.

UNIVERSAL JOINT.

1,410,791. Specification of Letters Patent. Patented Mar. 28, 1922.

Application filed January 6, 1921. Serial No. 435,425.

*To all whom it may concern:*

Be it known that I, EDWARD T. BANKS, a citizen of the United States, residing at Los Angeles, in the county of Los Angeles and State of California, have invented certain new and useful Improvements in Universal Joints, of which the following is a specification.

This invention relates to universal joints for connecting a drive and a driven member generally used in motor vehicle construction, and the primary object of the invention is to provide an improved universal joint, the parts of which can be readily adjusted for taking up wear thereon, whereby all lost motion and the noise incident thereto in the joint will be eliminated.

Another object of the invention is to provide an improved universal joint embodying novel rocker forks provided with novel seats or bearings for the ball terminals of the knuckle coupling member, the seats being removable and adjustable, whereby wear thereon can be readily taken up, the seats being divided and so constructed that the part which sustains the greatest friction and stress is the part which is adjustable.

A further object of the invention is to provide a novel type of housing for the joint, so constructed that heavy oil can be used therewith and the possibility of the oil leaking from the same is reduced to a minimum.

A still further object of the invention is to provide an improved universal joint of the above character, which is durable and efficient in use, one that is simple and easy to manufacture, and one which can be placed upon the market at a reasonable cost.

With these and other objects in view, the invention consists in the novel construction, arrangement and formation of parts as will be hereinafter more specifically described, claimed and illustrated in the accompanying drawings, forming a part of this specification, in which drawings:

Figure 1 is a longitudinal section through the improved universal joint, and

Figure 2 is a diametric section through the same, taken on the line 2—2 of Figure 1.

Referring to the drawings in detail, wherein similar reference characters designate corresponding parts throughout the several views, the letter A generally indicates the improved universal joint for connecting the drive shaft B, and the driven shaft C. The drive and driven shafts B and C are of the usual or any preferred construction, and have the universal joint A interposed therebetween.

The universal joint A includes a pair of right angularly disposed rocker forks 5 and 6, the terminals of which are arranged in radial alignment from a common axis point, and each of the rocker forks 5 and 6 includes sleeves 7 and 8 respectively, which are keyed or otherwise secured to the inner ends of the drive and driven shafts B and C. The inner ends of the sleeves 7 and 8 carry respectively the outwardly extending bowed arms 9 and 10, which constitute the rocker forks. Arranged intermediate the terminals of the arms 9 and 10 of the rocker forks 5 and 6 is interposed the knuckle coupling member 11, which includes the disc shaped body 12 and the right angularly disposed radially extending legs 13, which have formed on the terminals thereof ball ends 14.

The opposite faces of the terminals of the arms 9 and 10 of the rocker forks 5 and 6 are provided with inwardly extending recesses 15, which are adapted to receive the ball terminals 14 of the legs 13 of the knuckle coupling member 11. In order to facilitate the entrance of the ball ends 14 into the recesses 16, the arms 9 and 10 of the rocker forks 5 and 6 are slotted as at 16 and a set screw 17 extends through the slotted portion for a purpose which will be hereinafter more specifically described.

In order to provide a proper bearing for the ball ends 14 seats, sockets or bearings 18 are provided for the same, and these seats or bearings are fitted in the recesses 15. The bearings or seats 18 for each of the ball ends 14 include a section 19 and a section 20. The section 19 is mounted at the inner end of the recess 15 and is non-adjustable, while the section 20 is mounted in the outer end of the recess and is in the nature of a screw and is threaded into position, and it can be seen that by turning the section 20, the same may be adjusted in relation to the ball head 14. The inner faces of the sections 19 and 20 are each provided with substantially semi-circular recesses for forming bearings for engaging the ball ends.

In order to prevent the accidental rotation of the screw threaded adjustable bearing sections or seats 20, the screws 17 are provided, and it can be seen that by tightening the screws, the split portion of the arms 9 and 10 of the rocker forks 5 and 6 will be contracted.

A casing 25 is provided for housing the improved joint, so as to prevent the entrance of dust, dirt and the like thereto, and to prevent the leaking of oils therefrom. This casing or housing 25 includes the terminal segmental sections 26 and 27, the central portions of which are provided with sleeves 28 and 29 respectively for receiving the sleeve portions 7 and 8 of the rocker forks 5 and 6. The sleeves 28 and 29 of the sections 26 and 27 have a relatively larger diameter than the sleeves 7 and 8 and the outer terminals of the sleeves 28 are contracted to form collars 30, which have intimate engagement with the sleeves 7 and 8. The sleeves 28 have arranged therein springs 31, which are coiled around the sleeves 7 and 8, and the springs 31 have their terminals bearing respectively against the contracted ends of the sleeves 28 and the arms 9 and 10 of the rocker forks 5 and 6. Thus it can be seen that these springs 31 normally urge the sections 26 and 27 toward the outer ends of the sleeves 7 and 8 for a purpose which will hereinafter more fully appear. The sections 26 and 27 are mounted within a central transversely curved annular section 32, and the sections 26, 27 and 32 form substantially a spherical shaped housing. In order to facilitate the assembling of the housing, the central section 32 may be formed in two parts and bolted together as at 33, which is clearly shown in Figure 1 of the drawings. The inner edges of the sections 26 and 27 are provided with annular guides 34, in which is fitted a packing 35 which is adapted to bear against the inner surface of the central section 32. The outer edges of the central section 32 are also provided with annular packing or guide rings 36, in which is mounted a suitable packing 37, which is adapted to engage the outer surface of the sections 36 and 37. It can be seen that as the springs 31 tend to normally separate the sections 26 and 27, the packing carried by the sections will be compressed and thus form a tight intimate contact with the parts of the housing, whereby leakage of the lubricant therein will be precluded.

From the foregoing description, it can be seen that an improved universal joint has been provided, of exceptionally simple and durable construction, in which the wear thereof can be readily taken up, so that all lost motion and noise caused thereby will be eliminated in the joint. It can be seen that when the bearing sections 19 or 20 become worn, or the ball ends 14 of the knuckle coupling member become worn, it is merely necessary to adjust the sections 20 by turning the same in a manner similar to a screw.

As heretobefore stated, the recesses 15 are formed in the opposite faces of the arms 9 and 10 of the rocker forks 5 and 6, and the rocker forks are so related to each other, that the recesses 15 in the arms thereof extend in opposite directions to each other.

Thus it can be seen that in operation of the improved joint, the major wear will come on the adjustable seat or section 20, as it can be seen that these sections will be subjected to the severest strain. Assuming that the drive shaft B is rotating in a clockwise direction, the rocker fork 5 will transmit the power of the shaft through the medium of the sections 20 to the ball ends 14 of the knuckle coupling 11. In turn the knuckle coupling 11 will transmit motion through the ball ends 14 of the other leg 13 to the sections 20 of the seats 18 carried by the arms 9 of the rocker fork 6, which in turn transmits motion to the shaft C. Thus it can be seen that the full bearing force may be assumed by the adjustable sections 20.

Changes in details may be made without departing from the spirit or scope of this invention; but,

I claim:

1. A universal joint comprising a pair of rocker forks, a coupling member arranged intermediate the forks and having ball terminals, the terminals of the arms of the rocker forks having sockets formed therein for receiving the ball terminals, and adjustable and removable bearings fitted in said sockets for engaging said ball terminals.

2. A universal joint comprising a pair of rocker forks, a coupling member for uniting the rocker forks including a plurality of radially extending legs and ball ends formed on the legs, the terminals of the rocker arms having sockets formed therein for receiving the ball ends, removable seats carried by the sockets for engaging the opposite sides of the ball ends, one of said seats being adjustable.

3. A universal joint comprising a pair of rocker forks, a coupling member for uniting the rocker forks including a body, and a plurality of radially extending legs disposed at right angles, ball ends formed on the legs, the rocker forks having the terminals of the arms thereof provided with inwardly extending recesses opening out through the opposite faces thereof for the reception of the ball ends, a concaved removable seat fitted in the inner ends of the recesses, and a screw threaded concaved adjustable seat carried by the outer end of each of the recesses.

4. A universal joint comprising a pair of rocker forks, a coupling member for uniting the rocker forks including a body, and a plurality of radially extending legs disposed at right angles, ball ends formed on the legs, the rocker forks having the terminals of the arms thereof provided with inwardly extending recesses opening out through the opposite faces thereof for the reception of the ball ends, a concaved removable seat fitted in the inner end of the recesses, a screw threaded concaved adjustable seat carried by the outer end of each of the recesses, the arms of the rocker forks being so disposed in relation to each other that the sockets will extend in opposite directions, and means for preventing the accidental displacement of the adjustable seat.

5. A universal joint comprising a pair of rocker forks having the terminals thereof provided with inwardly extended sockets, slots communicating with the sockets, a coupling member for uniting the forks together including radially extending arms fitted in the slots, and ball ends fitted in the sockets, an adjustable screw threaded bearing member fitted in each socket for engaging the ball ends, and a screw extending through the slotted portion of the rocker forks for holding the screw threaded seats against displacement.

EDWARD T. BANKS.